United States Patent
Chahboune et al.

(10) Patent No.: US 11,964,903 B2
(45) Date of Patent: Apr. 23, 2024

(54) MOTOR VEHICLE ROOF GLAZING

(71) Applicant: SAINT-GOBAIN GLASS FRANCE, Courbevoie (FR)

(72) Inventors: Kamel Chahboune, Soissons (FR); Alexia Yon, Chantilly (FR); Juliette Jamart, Compiègne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/258,740

(22) PCT Filed: Dec. 22, 2021

(86) PCT No.: PCT/FR2021/052427
§ 371 (c)(1),
(2) Date: Jun. 21, 2023

(87) PCT Pub. No.: WO2022/136802
PCT Pub. Date: Jun. 30, 2022

(65) Prior Publication Data
US 2024/0043321 A1 Feb. 8, 2024

(30) Foreign Application Priority Data

Dec. 22, 2020 (FR) ....................... 2013928

(51) Int. Cl.
| | | |
|---|---|---|
| *B32B 3/10* | (2006.01) | |
| *B32B 17/10* | (2006.01) | |
| *B60J 1/00* | (2006.01) | |
| *C03C 1/04* | (2006.01) | |
| *C03C 4/02* | (2006.01) | |
| *C03C 8/14* | (2006.01) | |
| *C03C 17/04* | (2006.01) | |
| *C03C 17/34* | (2006.01) | |
| *C03C 17/36* | (2006.01) | |

(52) U.S. Cl.
CPC ........ *C03C 17/04* (2013.01); *B32B 17/10036* (2013.01); *B32B 17/10339* (2013.01); *B32B 17/1044* (2013.01); *B60J 1/001* (2013.01); *C03C 1/04* (2013.01); *C03C 4/02* (2013.01); *C03C 8/14* (2013.01); *C03C 17/3411* (2013.01); *C03C 17/3644* (2013.01); *C03C 17/366* (2013.01); *C03C 17/3681* (2013.01); *B32B 2255/20* (2013.01); *B32B 2255/28* (2013.01); *B32B 2307/4023* (2013.01); *B32B 2307/41* (2013.01); *B32B 2315/08* (2013.01); *B32B 2451/00* (2013.01); *B32B 2605/08* (2013.01); *C03C 2204/04* (2013.01); *C03C 2207/00* (2013.01); *C03C 2217/485* (2013.01); *C03C 2217/72* (2013.01); *C03C 2218/119* (2013.01)

(58) Field of Classification Search
None
See application file for complete search history.

(56) References Cited

U.S. PATENT DOCUMENTS

| | | | |
|---|---|---|---|
| 2019/0031559 A1* | 1/2019 | Hori | ........................ C03C 17/28 |
| 2020/0276792 A1* | 9/2020 | Laluet | ............... B32B 17/10174 |
| 2020/0290318 A1* | 9/2020 | Mannheim Astete | ...................... B32B 17/1077 |

FOREIGN PATENT DOCUMENTS

| | | |
|---|---|---|
| EP | 0 636 588 A2 | 2/1995 |
| FR | 2 703 043 A1 | 9/1994 |
| FR | 2 705 335 A1 | 11/1994 |
| WO | WO-2014013239 A1 * 1/2014 | ....... B32B 17/10036 |
| WO | WO 2018/050946 A1 | 3/2018 |
| WO | WO 2019/239055 A1 | 12/2019 |

OTHER PUBLICATIONS

International Search Report as issued in International Application No. PCT/FR2021/052427, dated Apr. 14, 2022.

* cited by examiner

*Primary Examiner* — Christopher M Polley
(74) *Attorney, Agent, or Firm* — Pillsbury Winthrop Shaw Pittman LLP

(57) ABSTRACT

A method for manufacturing a motor vehicle roof incorporating a glazing, in which at least one opacifying layer of ink(s), in particular at least one layer of colored ink(s), is applied by digital printing, in particular by inkjet, over at least 40% of the surface of one of the faces of at least one glass sheet, such that the composition of said ink(s) includes at least one glass frit, and where applicable one or more inorganic pigment(s), with a D90 value for the particle size distribution of less than 2 μm, and such that the ink(s) have a viscosity of between 1 and 50 mPa·s, the ink(s) further including a non-stick agent and/or a non-stick component and/or at least one non-stick agent and/or at least one non-stick layer being further applied to at least one layer of ink(s) and/or to at least one glass sheet.

19 Claims, No Drawings

MOTOR VEHICLE ROOF GLAZING

CROSS-REFERENCE TO RELATED APPLICATIONS

This application is the U.S. National Stage of PCT/FR2021/052427, filed Dec. 22, 2021, which in turn claims priority to French patent application number 2013928 filed Dec. 22, 2020. The content of these applications are incorporated herein by reference in their entireties.

The present invention relates to a motor vehicle roof (hereinafter referred to more simply as "vehicle roof") incorporating a glazing, as well as the method for manufacturing same.

Various comfort equipment exists in motor vehicles, in particular equipment integrated into the passenger compartment of vehicles, such as sunroofs, which may or may not be glazed. These specific roof parts, when glazed, particularly make it possible to allow more light to enter the vehicle, allow passengers to benefit from an attractive view of the sky, and where applicable, allow fresh air to enter, without the disadvantages of a simple opening made in the roof. The glazings used for these glazed sunroofs are traditionally transparent for aesthetic and comfort reasons and in order to provide a pleasant outside view, and can also be made from tinted glass, particularly in order to protect users from solar radiation.

Where applicable, the periphery of these motor vehicle roof glazings may be equipped with an opacifying frame, generally made from enamel, particularly in order to cover the structure of the passenger compartment on which the glazing is mounted (for example to hide a bead of glue), this frame (or this peripheral strip) usually being small in size so as not to impair the viewing clarity and the view sought, and being conventionally black in color. Alternatively, delicate white enamel prints can be also be used to enable the diffusion of the light produced by diodes fixed in the edge face of a laminated glass. All of these localized enamel prints are traditionally produced by screen printing, using screens or screen printing stencils which are appropriate and specific to each size of glazing.

The present invention has sought to develop novel vehicle roofs extending the range of existing products whilst being compatible with the requirements of the automotive market and the manufacturing constraints in this field, and in particular novel glazings for vehicle roofs offering more varied possibilities for customization on demand whilst guaranteeing that the user is comfortable, the obtaining of these novel glazings remaining sufficiently simple and compatible with the constraints of the industrial processes for vehicles.

This objective has been achieved by virtue of a method for manufacturing a motor vehicle roof incorporating a glazing, in which at least one opacifying layer of ink(s), in particular at least one layer of colored ink(s), is applied by digital printing, in particular by inkjet, over at least 40% of the surface of one of the faces of at least one glass sheet, such that the composition of said ink(s) comprises at least one glass frit, and where applicable one or more inorganic pigment(s), with a D90 value for the particle size distribution of less than 2 μm, and such that said ink(s) have a viscosity of between 1 and 50 mPa·s, said ink(s) further comprising a non-stick agent and/or a non-stick component and/or at least one non-stick agent and/or at least one non-stick layer being further applied to at least one layer of ink(s) and/or to at least one glass sheet. The method according to the invention can be characterized in that the printing is performed using a single-pass printing machine. The method according to the invention can be characterized in that the printer used is equipped with six series of print heads to enable printing with a set of six colors. The method according to the invention can be characterized in that the surface tension of the ink is between 20 and 40 mN/m.

A product obtained by said method has also made it possible to achieve this objective, this product being a motor vehicle roof capable of being obtained by said method, said vehicle roof incorporating a glazing comprising:
  one or more glass sheets, at least one glass sheet being coated over at least 40% of the surface of at least one face with at least one opacifying layer of ink(s), such that the composition of said ink(s) comprises at least one glass frit, and
  at least one layer of ink(s) and/or at least one glass sheet being coated with at least one non-stick agent and/or at least one non-stick layer, and/or
  at least one layer of ink(s) comprising at least one non-stick agent and/or one non-stick component. The motor vehicle roof according to the invention can be characterized in that the opacifying layer of ink(s) is at least one layer of colored ink(s).

The motor vehicle roof according to the invention can be characterized in that the composition of said ink(s) comprises one or more inorganic pigment(s). The motor vehicle roof according to the invention can be characterized in that said glazing is a monolithic glazing formed of a single glass sheet, said sheet being coated with at least one layer of said ink(s) on one face, in particular face F2, or characterized in that said glazing is preferentially a laminated glazing formed of at least two glass sheets and an interlayer, at least one of said glass sheets being coated with at least one layer of said ink(s) on one face, in particular face F2, F3, or F4. The motor vehicle roof according to the invention can be characterized in that said glazing has a light transmission TL of less than 10% in particular less than or equal to 0.1%, or an optical density of greater than or equal to 1, in particular greater than or equal to 3. The motor vehicle roof according to the invention can be characterized in that two different decorations are printed, for a different effect on the outside and on the inside of the passenger compartment. The motor vehicle roof according to the invention can be characterized in that several layers of ink are overlayed on the same face in order to produce a double image, for example a first layer or print forming a first image, a second layer or print being a white layer, and a third layer or print forming a second image. The motor vehicle roof according to the invention can be characterized in that said glazing is equipped, on the same face and/or on at least two different faces of glass sheet(s) of the glazing, with at least two different coatings or two different layers including at least one layer of said ink(s), the second layer or the second coating being either a second mineral layer formed of digital printing ink(s), or a layer with a different decorative effect from said layer or layers of ink(s), or a layer or a coating or a film or a sheet with an additional functional effect, particularly in terms of thermal comfort, such as a low-emissivity or solar control coating.

The present invention has resulted in the development of a decoration solution which is compatible with motor vehicle production lines and which extends the range of existing vehicle roof products by making it possible to produce an entirely new variety of decorations on request, and in particular colored decorations, these decorations being obtained in a simple and economical way. Depending on the face or faces on which one or more layers of ink(s)

are deposited (in particular and advantageously one or more colored layer(s) of ink(s)), it is possible to produce one or more decorations presenting different appearances depending on whether the glazing is viewed from one side or the other. The invention for example makes it possible to obtain an opaque sunroof retaining the aesthetics of the glass and its shine on the outside of the vehicle, and a customized decoration on the inside, for example a decoration imitating a landscape, a sunny sky or a starry night, or materials (for example a carbon, wood or leather effect), depending on the client and/or the interior decoration of the vehicle, etc, or conversely to have an opaque glazed finish on the vehicle interior and a customized decoration on the outside, or even two identical or different customized decorations on the inside and outside.

The digital printing (this technique allowing documents to be printed directly from computer data) used according to the invention offers infinite decoration possibilities, particularly from any photo having a good resolution, for example of greater than or equal to 700 dpi (or "PPI" or "pixels per inch"), or a vector file. In addition to the various decoration possibilities, the method can also be used to obtain technical effects, such as anti-reflective effects (the printed layer for example being selected in order to be mat) or anti-fingerprint, or a functional coating, for example allowing interactions with the light, or having conductive tracks, etc.

In addition to enabling high-quality high-resolution prints to be produced (of photograph type) at high speed, where applicable in small quantities or by customizing on a per-piece basis without requiring costly equipment or complex equipment changes, digital printing can be adapted to the geometric constraints of the products (non-contact method) and makes it possible to obtain a great variety of decorations with little difficulty compared to the screen printing methods currently used in the automotive industry. The image to be printed can be stored digitally, avoiding the use of screens, gravures, etc, in contrast to screen printing methods which require a specific screen for each decoration and for each product to be coated. It enables large surfaces to be printed and offers an extensive gamut of colors which can be reproduced using a reduced set of primary colors, whereas screen printing methods require different screens for each color. The decoration can be printed in a very flexible manner using image files generated by a computer and the printing technique can be interfaced with image processing devices making it possible to easily and quickly modify template images in order to further vary the prints and offer greater design freedom. Stoppages or cleaning operations are not required between the different decorations and ink waste is avoided, as the ink is only deposited where necessary.

However, as one disadvantage of digital printing is the small size of the print head nozzles, the present invention has also selected inks to enable the printing required for the desired application to be performed without any concern, particularly regarding obstructed nozzles.

It should be noted that deposition of inks has already been attempted on glass, mainly for the decoration of architectural glass, however solutions developed to date have proven to not be very suitable for the decoration of motor vehicle glazings, particularly due to problems related to automotive manufacturing requirements (such as the high speed of the production lines) or even problems of bonding to the automotive glass forming dies. Furthermore, the formulations generally used for screen printing deposition in vehicles cannot themselves be used directly in inkjet type digital printing methods, since these formulations, which are particularly viscous and have a particle size of greater than 5 µm, are capable of blocking the printing nozzles.

In particular, the multi-pass printers used to date for architectural glass have shown productivity levels which are too low and are incompatible with the typical cycle times of automotive markets (the coating steps should generally not exceed 60 s per glass). In addition, as the glazing used for motor vehicle roofs is generally curved, it was not conceivable to apply coatings over a large area, particularly on parts having to be brought into contact with other glass or forming or bending dies, due to bonding problems which may occur during forming or bending or folding or bowing.

Until the present invention, there was therefore no technique available that made it possible to easily and economically decorate the glazing of vehicle roofs, whilst respecting the constraints, particularly thermal and mechanical, specific to this application, and while offering great flexibility and numerous variations in terms of the decorations possible.

The motor vehicle roof incorporating the glazing according to the invention may comprise one or more sheets of (or "made of") glass. This may specifically be a monolithic glazing, consisting of a single sheet of tempered or (thermally or chemically) strengthened glass, or this may be laminated glass, consisting of at least two glass sheets assembled by means of an interlayer, as detailed below.

The glass sheets (or "windows" or "glass plates" or "glass substrates" or "glass") are advantageously soda-lime (advantageously mineral) glass sheets, and may be transparent and colorless (particularly clear or "extra clear" glass i.e. light transmission TL of greater than 90%) or may be colored or tinted (generally mass-colored or tinted). They are usually geometrical in shape, in particular quadrilateral or rectangular or square, and may be flat or rounded/curved. Preferentially, they are rounded, their shape following in particular the curve of the roof. They are moreover generally smooth, i.e. lacking in texture.

The glass sheets preferentially have a thickness (for each) of between 0.7 mm and 6 mm, in particular between 1 mm and 4 mm, for example a standard thickness of 1.6 mm or 2.1 mm. The total thickness of the glazing is preferably less than 5 mm.

Preferentially, the motor vehicle roof glazing according to the invention is a laminated glazing comprising at least two glass sheets, said sheets being joined together adhesively via a lamination interlayer, this glazing comprising more specifically:
- a first glass sheet, referred to as the "outer" glass sheet, i.e. intended to be positioned outside the passenger compartment of the vehicle, and having two main faces (larger faces) respectively called face 1 (or F1), which is the face which must be facing outward, and face 2 (or F2), which is the face which must be facing the interlayer,
- a lamination interlayer (or interlayer or interlayer film or interlayer sheet or intermediate sheet),
- a second glass sheet, referred to as the "inner" glass sheet, i.e. intended to be positioned inside the passenger compartment, and having two main faces respectively called face 3 (or F3), this face facing the interlayer, and face 4 (or F4), this face facing the passenger compartment.

It should be noted that the terms "first" or "second" hereinbefore are only used to distinguish the various sheets and do not refer to a deposition or arrangement order.

In the case of the laminate, the outer glass sheet is generally at most 2.1 mm thick, the inner sheet may be of a similar thickness or a thickness less than that of the outer sheet, one and/or the other glass may or may not be chemically or thermally tempered (for safety reasons).

Where applicable, one and/or the other glass may be tinted, depending on the position and choice of decoration, and/or the lamination interlayer may be colored, in order to limit the penetration of heat into the passenger compartment by absorbing infrared radiation.

The lamination interlayer takes the form of one or more hot-melt and adhesive layer(s) or film(s) or sheet(s), made from a polymeric material, particularly formed of at least one thermoplastic polymer or copolymer, such as ethylene-vinyl acetate (EVA), polyvinyl butyral (PVB) or polyurethane (PU), or mixtures or copolymers or derivatives thereof, the interlayer being most commonly made of PVB. It may also be composite (for example a composite of PVB and a polyester film or a polyterephthalate of ethylene film or a plasticizer for vibration and acoustic damping properties). The total thickness of this interlayer (whether it be made of one or more sheets) is generally less than 1 mm, in particular 0.7 mm or 0.3 mm, this interlayer being able to be transparent, clear, extra clear or optionally tinted.

As shown according to the invention, the layer of ink(s) deposited or the coating comprising said layer of ink(s) (or the layers of ink(s) deposited one on top of another when there are several of them overlayed), coats at least one of the main faces of a glass sheet of the glazing according to the invention over at least 40% of its surface, preferably at least 50% of its surface, and in a particularly preferred manner at least 75% of its surface, or indeed over its entire surface.

By layer of ink(s), it is understood that the layer can be formed of one or more inks (each advantageously conforming to the definition given in the invention), where applicable mixed and/or overlayed, simultaneously (simultaneous deposits for example during the same inkjet printer pass) and/or optionally consecutively (several passes forming said layer). In particular, several primary color inks may be overlayed to form the layer, the printed image being thus formed of a large number of juxtaposed small ink spots or drops.

The thickness of each layer of ink(s) is in particular between 3 and 8 microns. Where applicable, several layers of ink(s) can be deposited one on top of the other, each deposition then being followed by drying, as described below, the total thickness of the coating formed in this case preferentially being between 3 and 20 microns. The thickness of a layer is understood to mean the geometric thickness (also called physical or actual thickness), this thickness being measured once the ink has been heat treated in order to eliminate the solvent and other possible organic part(s) of the composition.

The inks used according to the invention are substantially mineral inks (formed only of inorganic/mineral components with the exception of the solvent and additives which need to be eliminated during the glazing forming or ink firing process) and are in particular what are referred to as "ceramic" inks, having an enamel-based formulation chosen in order to be compatible with the desired printing. They are particularly formed of at least one glass frit (or of a mixture of glass frits), designed to melt during subsequent heat treatment in order to form a vitreous matrix which will bind to the substrate. The composition of the inks according to the invention may also comprise one or more pigments which are fixed to the substrate by the frit, the pigment(s) being advantageously inorganic/mineral pigments (in contrast to common inkjet formulations generally comprising organic pigments). Said pigments in particular have a mean diameter of less than 500 nm, more preferentially a mean diameter of between 100 and 300 nm. The mean diameter can be measured using Scanning Electron Microscopy (SEM). Said pigments have the advantage of not being altered during the method, particularly after drying and firing of the inks. Besides this solid fraction, the composition of the inks also initially comprises a liquid fraction, formed of at least one solvent and where applicable one or more additives.

The glass frit is preferably bismuth borosilicate-based, and/or optionally zinc borosilicate-based. The mass (or weight) fraction (or percentage) of the glass frit in the mineral ink is preferentially between 10 and 50%, in particular between 15 and 50%. The pigments can be any known mineral pigment or any mixture of known mineral pigments, and are in particular based on one or more compounds or oxides such as chromium oxide, titanium dioxide, iron oxide, cobalt titanate, cobalt chromate, cobalt silicate, tin chromate, iron-doped zirconium silicate, manganese chromate, cobalt phosphate, etc. The mass fraction of the pigment(s) in the mineral ink is preferentially between 1 and 25%.

The mass fraction of the solid fraction (frit and pigments) in the mineral ink is preferentially between 10 and 60%, the relative percentages of pigment(s) and frit(s) in the solid fraction particularly making it possible to adjust the optical density and the opacity of the ink.

The liquid fraction (generally representing 40 to 90% by weight of the ink) is generally formed of at least one solvent or dispersion medium, and one or more additives, including for example at least one resin acting as a binder and making it possible to maintain the properties of the ink and the structure of the deposits until their heat treatment, the level of additives not generally exceeding 10% by weight.

In terms of solvent (generally representing at least 30% by weight of the ink, and in particular 30 to 50%), it is possible to use for example one or more alcohols, glycol ethers, lactates, glycol ether acetates, aldehydes, ketones, oils, aromatic hydrocarbons, etc, or more simply water.

In terms of additives (representing less than 10% by weight of the ink), it is particularly possible to use a binder (for example one or more acrylic or alkyd resins), one or more additives making it possible to adjust the physical properties of the ink such as one or more dispersing agents (such as those sold by the company Byk under the reference Disperbyk) to prevent flocculation and/or sedimentation of the solid phase, one or more surfactants (such as those sold by the company Byk under the reference 301, 302 or 337), leveling agents (such as those sold by the company Evonik under the reference Tego), one or more defoamers (such as those sold under the reference 51, 52, 53 by the company Byk), one or more rheological agents, etc.

The dimension of the grains or particles constituting the solid mineral phase (including in particular the frit(s) and pigments) of the inks is selected in accordance with the invention such that the D90 value of their particle size distribution is less than 2 μm, preferably less than 1 μm, more particularly less than 0.9 μm.

In the present invention, the particle size distribution is assessed using the D90 percentile, meaning that 90% of the particles of all the particles considered are less than D90 in size. The size or dimension of a particle is known as its equivalent diameter, i.e. the diameter of the sphere which would behave in an identical manner during the particle size analysis of the particles (or the powder formed from said particles) forming (initially) the solid mineral phase in question, the particle size distribution (all particle sizes) being measured in particular by laser particle size analysis according to standard ISO 13320:2009. The desired particle size is in particular obtained by milling.

As stated according to the invention, the viscosity, when depositing the inks used, is also between 1 and 50 mPa·s, particularly between 5 and 20 mPa·s, the viscosity being measured at the proposed temperature of application of the ink (generally between 30 and 40° C.). Also advantageously, the surface tension of the ink is between 20 and 40 mN/m.

As previously defined, the solution according to the invention also combines, with the use of inkjet type digital printing and the selection of the inks to produce a colored opacifying coating on demand over a large surface area, selecting non-stick (or "anti-stick") characteristics for the ink(s) (in particular their frit(s)) and/or the addition of materials (in the form of non-stick agent(s)/additive(s) or, where applicable, non-stick layer(s)) in the composition of the ink or on the ink or the glass to prevent sticking during any forming step.

The "non-stick" properties or characteristics according to the invention mean non-adhesion of the layer(s) of ink(s) to a glass another than that on which they are deposited or to a pressing tool during a bending or forming operation. These properties are assessed by performing gravitational bending on a glass coated with the layer of ink(s) to be tested for 10 minutes at 640° C. and by checking that no transfer or bonding of the layer has taken place on the test glass. These properties are obtained in particular by the choice of ink(s), thus comprising a non-stick agent/additive or a non-stick component, i.e. in particular able to crystallize, at least partially, so as not to adhere to the different elements with which the ink(s) may be in contact, the crystallization in question being obtained particularly by performing a heating and cooling phase on the layer, in particular before the other heat treatment operations related to bending or forming, these heating then cooling phases enabling the at least partial crystallization of the layer. Alternatively, or even cumulatively, these properties can also be obtained by applying at least one non-stick agent and/or at least one non-stick layer to at least one glass sheet (which must particularly be brought into contact with the ink-coated glass) and/or to said layer(s) of ink(s).

In a first embodiment, the non-stick properties are thus obtained by the choice of the ink(s) (comprising an agent/additive or component able to at least partially crystallize). In particular the ink, particularly in its solid fraction, may contain one or more nucleating additives, at a level for example of at least 0.05% in this case and particularly not exceeding 10% by weight of the ink, this (these) nucleating additive(s) being selected for example from zinc silicates, aluminum silicates, zinc borates, zinc titanates, bismuth silicates, bismuth oxides, bismuth titanates, refractory products having melting points above 650°, or combinations thereof In another embodiment enabling the adhesion problems to be avoided, at least one glass sheet or at least one layer of ink(s) according to the invention is further coated with at least one non-stick agent, for example sprayed or sprinkled on its surface, or with at least one non-stick layer, for example deposited on its surface by spraying, digital, curtain, roller or screen printing, for example a non-stick enamel layer sold by the company Prince Minerals under the reference DV788380, or a non-stick enamel layer sold by the company Johnson Matthey under the reference 1L6030, or even a non-stick ink layer sold by the company Prince Minerals under the reference DJ70474.

These different modes according to the invention may be alternative or even used in combination. By virtue of the non-stick properties obtained, the printed decorations can be deposited on surfaces which are located within a laminated glazing (face F2 or face F3), which makes it possible to use inks without being limited by the durability specifications (mechanical and chemical resistance) required for automotive applications, as the decorations are protected. These properties are also advantageous for tempered monolithic glazing, the printed surface of which may be brought into contact with a pressing mold or for a laminate also having a decorated outer face.

The use, in the method according to the invention, of a non-stick ink or a non-stick agent or a non-stick layer thus makes it possible to avoid, following the heat treatment of the layers, particularly when they are laminated, ink bonding problems, in particular during the forming or bending steps used in the automotive glass industry. When the ink layer is in contact with another surface, for example a mold surface, the article may be molded and fired at the same time without ink transfer or bonding problems. The same applies when the ink layer is in contact with a second glass during a bending operation. The bending or forming operations are not thus hindered by the aforementioned bonding phenomenon, and the decorations applied can retain their integrity.

The ink layers or compositions selected according to the invention are furthermore opacifying (this is particularly the case for compositions which crystallize partially during firing which already form a more or less opaque finish), the opacity particularly being able to be adjusted by varying the thickness of the layers. "Opacifying" is understood to mean that the coating reduces the light transmission TL of the glazing or increases its optical density, with respect to the same glazing not equipped with said coating, in particular reduces the light transmission TL of the glazing to a value less than or equal to 10% or increases its optical density up to a value greater than or equal to 1, particularly greater than or equal to 3, the opacifying character having particular advantages in terms of sun protection or advantages in terms of privacy inside the vehicle.

Advantageously, the motor vehicle roof incorporating the glazing (coated) according to the invention is thus more or less opaque and has a light transmission TL of less than or equal to 10%, and in particular less than or equal to 0.1%, or an optical density of greater than or equal to 1, and in particular greater than or equal to 3, whereas intrinsically (i.e. without a coating), the glazing generally has a light transmission TL of greater than 70% or an optical density of about 0.05 or less. The light transmission TL is measured according to standard EN 410 using illuminant A (standardized lamp), the measurement being performed for example using a spectrophotometer, and the optical density is measured using a densitometer (for example a densitometer with the reference 331C sold by the company X-rite).

The mineral inks selected according to the invention are particularly suited to deposition by digital inkjet printing on glass substrates for vehicle roofs, by selecting for example sets of primary colors enabling extended gamuts of colors to be achieved. Each primary color can particularly be formulated using mineral ink according to the invention by selecting a suitable mineral pigment. The production of the gamut can then be achieved using several colors, for example a set of four (CMYB model: cyan, magenta, yellow, black) or six colors (BGWORK system: blue, green, white, orange, red, black), the set of six colors being preferred. The desired color is for example defined by a ratio between the different colors, and is advantageously obtained by simultaneous overlay or deposition of the inks of each of the colors in the ratios (or proportions) used. It is not necessary to prepare a solution with the correct ratios beforehand, the ratios are for example simply entered into the printer management software at the time of printing. They can therefore be adjusted very easily according to the desired decorations, the resulting color obtained having good uniformity.

As specified hereinbefore, the decoration is preferably printed with a set of six colors according to the BGWORK model on one, or even two faces, two different decorations, where applicable, being able to be printed on one face of a sheet and on another opposite face (one facing outward and the other facing inward), or even on the same face by overlaying at least two different layers as subsequently shown, for a different effect depending on whether one is positioned outside or inside the passenger compartment.

As previously stated, the motor vehicle roof incorporating the glazing according to the invention may be a monolithic glazing, formed of a single glass sheet, in this case said sheet is coated with at least one layer of ink(s) over at least one face, in particular the face intended to face the inside of the passenger compartment (or face F2 of a monolithic glazing).

More generally and preferably, the glazing is a laminated glazing formed of at least two glass sheets and an interlayer, at least one of the glass sheets being coated with at least one layer of ink(s) over at least one face, in particular over a face within the laminate (facing the interlayer—face F2 or F3) in order to protect said layer from bad weather or abrasion, or over the face of the laminate which must be located on the inside of the passenger compartment (face F4).

Where applicable, several ink layers may be overlayed on the same face with a view to producing a double image (different on the two opposite sides). For example and advantageously, at least two and in particular three layers or prints can be produced with intermediate drying after each printing, the first layer or print forming a first image (for example a carbon effect), the second layer or print being an opaque layer, in particular white, and the third layer or print forming a second image (for example a sunny or starry sky). The glazing is thus formed from the following stack of layers, going from the side intended to be facing outward to that intended to be facing the inside of the passenger compartment, or vice versa: glass/PVB/glass/layer1/layer2/layer3. Alternatively, the layer 1/layer 2/layer 3 stack may be on a face within the laminate (or PVB side) such as one of faces F2 or F3. The glass on the outer side is for example tinted and the glass facing inward is for example clear or extra clear or tinted.

According to a preferred embodiment, the motor vehicle roof incorporating the glazing according to the invention is equipped, on the same face and/or on at least two different faces of glass sheet(s) (on a single sheet or two different glass sheets of the glazing), with at least two different coatings or different layers including at least one layer of said ink(s) according to the invention, the second layer or the second coating being either another layer of digital printing ink(s) according to the invention as previously mentioned, or a layer with a different decorative effect from a layer of ink(s) according to the invention, or a layer or a coating or a film or sheet with an additional functional effect, particularly in terms of thermal comfort.

For example and advantageously, the layer(s) of ink(s) according to the invention are combined with a coating for reflecting and/or absorbing solar radiation and/or heat (such as what is referred to as a "low-emissivity" or "solar control" coating) in order to offer increased thermal comfort inside the vehicle, this coating, in the case of a laminated glazing, being located for example on face F2, F3 or F4, this coating particularly being in the form of (a) thin layer(s) (each a few nanometers to several tens of nanometers thick).

For example and non-limitingly, the motor vehicle roof incorporating the glazing may be designed with an infrared radiation reflective function in order particularly to preserve the thermal comfort inside the vehicle in summer, obtained for example:

by an infrared reflective layer, particularly silver-based, obtained particularly by magnetron sputtering, and deposited for example on face F2 or F3 in the case of a laminate, and/or by a film (or sheet) having infrared reflecting properties by laminating it with the glass sheet(s) (like, and in addition to, the interlayer in the case of a laminated glazing), for example a polyethylene terephthalate (PET)-based polymeric film (PET), and/or the glazing may be equipped with a heat reflective function in order particularly to preserve the thermal comfort inside the vehicle in winter, obtained for example:

by a low-emissivity coating, obtained particularly by magnetron sputtering, and deposited, for example and in the case of a laminate, on one of faces F2, F3 or F4, and/or by a heat-reflective coating consisting in overlaying layers with high and low refractive indices and in adjusting the interference filter obtained (called the "Bragg filter"), obtained particularly by the sol-gel process, for example on face F2, F3 or F4 in the case of a laminate, etc.

More particularly, in order to obtain these thermal comfort properties, at least one functional layer is used, particularly an electrically conductive functional layer, this layer preferably being between two thin dielectric layers, this electrically conductive functional layer being for example selected from metallic layers, particularly silver or niobium, or even gold, and layers of a transparent conductive oxide (referred to as TCO layer), particularly selected from indium oxide and tin oxide (referred to as ITO layer), doped tin oxides (for example doped with fluorine or antimony), doped zinc oxides (for example doped with aluminum or gallium), these different functional layers being able to be used in combination (it being possible for example to place one or more silver layers at face F2 or F3 and a TCO layer at face F4 in particular). In the case in which one or more layers of silver are used (particularly in a stack of layers), the thickness of the silver layer or, where applicable, the sum of the thicknesses of the silver layers is preferably between 2 and 50 nm, particularly between 3 and 40 nm, and in the case in which the stack of thin layers comprises at least one layer of indium oxide or tin oxide, its thickness is preferably between 30 and 200 nm, particularly between 40 and 150 nm.

In order to protect the electrically conductive layer(s), each of these layers is preferably flanked by at least two dielectric layers, these dielectric layers being in particular based on oxide(s), nitride(s) and/or oxynitride(s) of at least one element selected from silicon, aluminum, titanium, zinc, zirconium, tin, the stack particularly comprising preferably at least one nitride-based layer, particularly a silicon nitride, the nitride-based layers having in particular blocking properties, making it possible to prevent the oxidation of the functional layers, and having low emissivity, the thickness of each dielectric layer being for example between 2 and 100 nm.

This type of stack has particularly useful electricity-conducting or infrared-reflecting properties to ensure, as required, the thermal insulation of the passenger compartment and/or heating, power supplies can also be coupled, such as bands of silver paste deposited by screen printing on the stack of thin layers, at the two opposite edges of the glass sheet.

The aforementioned stack of layers can be deposited by various known techniques, particularly by chemical vapor deposition (CVD), or more advantageously by cathode sputtering, in particular magnetic-field-assisted cathode sputtering (magnetron method).

In one non-limiting embodiment making it possible to obtain a motor vehicle roof incorporating a laminated glazing according to the invention having, in addition to the layer or layers of ink(s) according to the invention, good thermal comfort, the outer side of the glass may for example be clear and coated with an infrared reflective layer and the glass facing inward may be tinted and coated with a low-emissivity layer which makes it possible to keep the heat inside the vehicle in winter.

In the case of heat-reflective coatings or those having solar control properties, the coating may also substantially consist of a stack of dielectric layers alternately with low and high refractive indices (without necessarily the presence of a functional layer as described above), for example layers with an index respectively of greater than 1.7 and less than 1.5, the refractive indices of the layers being measured for example with an ellipsometer. This type of stack using an arrangement based on the constructive optical interferences alternating layers with high and low refractive indices makes it possible to obtain solar control properties through the glazing without affecting the optical properties of the initial glazing (not coated). The thin layers of the dielectric stack may be deposited for example by the magnetron method or by a wet coating method, for example by a sol-gel method.

As already mentioned, the dielectric layers may be nitride or oxide layers (metallic, metalloid or mixed), substantially consisting (to at least 50%, and in particular to at least 80% by weight), or even solely consisting (with the exception of any impurities present), of nitrogen (for nitrides) or oxygen (for oxides), and of one or more metals and/or metalloids mentioned in their name, the designation "metal or metalloid oxide or nitride" not excluding, where applicable, the presence of other chemical elements, as each layer can particularly be doped, and not necessarily meaning that the oxides or nitrides are stoichiometric, since these oxides or nitrides can indeed be substoichiometric, superstochiometric or stochiometric.

The dielectric stack covers at least part or an entire face of one of the main faces of a glass sheet, this face particularly being the outer face for a monolithic glazing, or one of faces F2 or F3 for a laminated glazing. Optionally, the glazing may also have a solar control stack on at least two different faces (these stacks can be identical or different) in order to amplify the solar control effect.

The glazing can also comprise other coatings, such as one or more liquid crystal layers (PDLC), conductive strips, etc., according to the desired functionalities or characteristics.

As mentioned above, the present invention also relates to a method for manufacturing a motor vehicle roof incorporating a glazing according to the invention as defined hereinbefore. In this method, the ink is deposited by digital inkjet type printing. In this technique, enabling effective and rapid deposition and drying, the liquid ink forced through the printing nozzles separates into droplets, each microdrop, where applicable, being projected and/or deflected, electrically or magnetically, during its projection toward the print media. The printed image is thus formed of a large number of small juxtaposed ink spots.

In a particularly preferred embodiment, the printing is performed using a "single-pass printer" type high-productivity printing machine (with a printing speed per glass sheet of less than 60 s) more compatible with the automotive market, since the inks selected are adapted to this printing method. An example of a single-pass printer is given for example in patent application WO2018050946A1, single-pass printers being able, where applicable, to use print head rotation and vector printing (instead of the "raster" mode used by traditional machines), no use with the inks and coatings selected according to the present invention with a high coverage level and an opacifying effect for the desired application having however been envisaged to date with such printers. Also preferably, the printer used is equipped with six series of print heads to enable printing with a set of six colors.

To produce a selected decoration, it is possible for example to use, in a preliminary step, a simple good quality photo, or a vector file corresponding to the desired decoration, and to extract the digital data (by performing what is known as an "RIP") in order to format them for the machine, before printing.

The inks used according to the invention may initially be produced by forming a dispersion of the frit (obtained in a known manner from the high-temperature melting of a mixture of vitrifiable raw materials) or of the glass frits selected in a dispersion medium, by milling the dispersion in order to reduce the size of the particles, and filtering the dispersion in order to eliminate the oversized particles. For the pigments, it is also possible to form a second dispersion of the pigment(s), mill this dispersion to reduce the size of the particles and filter it and combine it with the dispersion of filtered frit, or the frit(s) and pigment(s) can be dispersed together and milled in a single dispersion which is then filtered. Commercial inks may also be used if they meet the conditions of the invention and/or can be adapted (diluted, milled, etc.) to meet the conditions of the invention. In particular, the frit and any pigments can be milled as required until the particle size distribution D90 of the glass frit(s) and the pigment(s) is less than 2 µm, in particular less than 1 µm, and the rheological properties, and in particular the viscosity, of the ink can be adjusted where applicable.

Commercially available inks which can be used as inks according to the invention are particularly the inks sold under the reference Spectrum R by the company Ferro.

Where applicable, other agents can be added to the inks formed and/or selected according to the invention, such as a dispersing agent (for example when adding solvent), a surfactant (for example after milling), a non-stick agent, etc, before, during or after the milling and filtering steps.

The ink compositions are applied to the surface of at least one glass sheet of the vehicle roof glazing to form the desired decoration(s), generally on the float glass prior to heat treatment of the glazing and firing of the inks. Where applicable, the glazing is bent in a mold or in a sunken support to obtain the desired shape, whereas the ink composition(s) is/are fired.

The deposition of each layer can be followed, if necessary, by a drying step to evaporate the solvent, and solidify and fix the layer. Where applicable, the ink can be dried at ambient temperature (particularly by leaving the substrate coated with the ink to dry in the open air), but, due to high printing speeds and the nature of the support, forced drying is preferably performed, particularly by heat, convection and/or radiation treatment, particularly under 200° C., for example between 150 and 180° C. Where applicable, when several layers of ink are printed, particularly one on top of another, intermediate drying is preferably performed (for example at around 150° C.) after each printing operation.

After deposition and optional drying, the mineral inks undergo a heat treatment or firing particularly making it possible to fix the inks and generally performed (particularly for laminated glazing) during the conventional bending of the glass, this heat treatment being performed for example for a few hundred seconds (for example 200 s) and at temperatures of several hundred degrees, for example about 650° C.-700° C.

In the method for manufacturing a motor vehicle roof incorporating a curved monolithic glazing, the glass, preferentially tempered, is produced particularly in a pressurized bending furnace. The glass is first heated to approximately 650-700° C. then transferred to a press and is pressed to the desired shape. As already mentioned, advantageously, the inks selected according to the invention do not bond to the dies of said press.

In the method for manufacturing a motor vehicle roof incorporating a curved laminated glazing, once the coating with the layer(s) of ink(s) has been performed on one and/or other glass sheet, the printed glass sheet can, where applicable, be pre-fired in order to develop the non-stick effect of the coating concerned. The glass sheets are placed one on top of the other before simultaneously bending the sheets using a hot bending method and firing the inks. A lamination treatment to assemble the glass sheets with an interlayer can also be performed by assembling the sheets, where applicable already curved, with the interlayer and by subjecting the assembly to a temperature increase and a pressure reduction for example by an autoclave method, a vacuum method, a calendering method, etc.

As already previously mentioned, in one embodiment of the invention, it is possible to deposit, on the layer of ink(s) once applied, a non-stick agent or a non-stick layer, for example by spraying, digital printing, curtain, roller or screen printing, in addition to the layer or layers of ink deposited.

In the case of other combined layers (for example low-emissivity, solar control, etc), these can also be deposited in another step before or after printing the layer(s) of ink prior to optional assembly, optional bending, and firing.

Where applicable, the method may also comprise an operation for cutting the glass sheet(s), for example using water jets or a mechanical tool, etc., followed by a shaping operation (grinding, beveling, etc.).

The printed inks preferably comprise one or more inorganic pigments which have a mean diameter of less than 500 nm, more preferentially a mean diameter of between 100 and 300 nm. The mean diameter can be measured using Scanning Electron Microscopy (SEM). Said pigments have the advantage of not having been altered during the method, particularly after drying and firing the inks. The printed inks demonstrate satisfactory lamination feasibility and offer good adhesion, without requiring prior treatment of the support and/or the use of an adhesion promoter or primer, the ink layers being printed directly upon contact with the glass. Furthermore, the layers of ink(s) mechanically weaken the glass less than conventional enamels, particularly enabling a large surface area to be printed. They also offer good resistance to scratches (of approximately 20 N—measured using a sclerometer), or to mechanical stresses such as metal friction, this resistance being compatible with the specifications of the vehicle, and good results in test of resistance to weathering of standard EN1 096-2. After drying and firing the inks, the decorations obtained are also particularly resistant to soiling, and the inks selected are also light-stable and have excellent resistance to ultraviolet radiation, particularly due to their mineral character.

The glazing of the present invention is suitable for equipping any transport vehicle which may have a sunroof (such as a vehicle, bus, etc.). The glazed motor vehicle roof can be fixed or opening, sliding and/or tilting and/or folding, or even panoramic or of canopy type. The roof and its control can be manual or electric. The roof may also comprise one or more additional functional or structural elements such as a frame, one or more connectors, one or more cables, one or more mountings, etc.

The features and advantages of the invention are shown by the non-limiting examples described hereinafter.

Example 1: In the first example according to the invention, a laminated glazing was produced for a motor vehicle roof formed of two glass sheets separated by a thermoplastic intermediate layer, this glazing being decorated on face F2 and on face F4. Each glass sheet was a clear and neutral 2.1 mm thick soda-lime float glass sheet sold by the company Saint-Gobain Glass under the brand Planiclear® (hereinafter designated by the abbreviation PLC) and having, when taken alone, a light transmission TL of 90%, and the thermoplastic intermediate layer was a 0.76 mm thick polyvinyl butyral layer (hereinafter designated by the abbreviation PVB) sold by the company Solutia under the reference RC41. The coating of the outer glass sheet was obtained initially by producing a first decoration on face F2 over the entirety of said face by inkjet printing using a single-pass machine equipped with six color print heads (with drying after deposition for 2 minutes at 130° C.) in order to obtain a layer of inks with a (final) thickness of 5 μm, the viscosity of the inks when deposited being less than 50 mPa·s, then by depositing on this decoration a non-stick layer by screen printing at a wet thickness of 15 μm (giving a final thickness of the layer of 6 μm) and at a viscosity of 15 Pa·s, before pre-firing for 180 s at 600° C.

The coating of the inner glass sheet was obtained by producing a second decoration on face 4 over the entirety of said face by inkjet printing using a single-pass machine (with drying after deposition for 2 minutes at 130° C.) to obtain a layer of inks with a (final) thickness of 5 μm, the viscosity of the inks when deposited being less than 50 mPa·s.

The inks used for the decorations were inks from the range of inks sold by the company Ferro under the reference Spectrum R, formed of frits and inorganic pigments and having a particle size distribution value D90 of less than 2 μm, and the material of the non-stick layer added was an enamel with the reference DV788380, sold by the company Prince Minerals.

The coated glass sheets were then curved for approximately 200 s at temperatures of around 680° C.

It was observed that the two glasses could be separated without difficulty and that no transfer of material was visible on the inner glass.

The coated sheets were then laminated via the intermediate PVB layer. The optical density of the coated glazing obtained was greater than 3.

After lamination, the first decoration was visible from outside the vehicle and the second decoration visible from inside. This configuration also made it possible to include different functional elements (sensors, antennae, etc.) between the two glasses while being concealed by the decorations.

Example 2: In the second example according to the invention, a laminated glazing was produced for a motor vehicle roof formed of two glass sheets separated by a thermoplastic intermediate layer, this glazing being decorated on face F2. The outer glass sheet (intended to be positioned on the outside of the vehicle) was a PLC glass with a thickness of 2.1 mm, the other glass sheet (inner) was a soda-lime float glass with a thickness of 2.1 mm, tinted and having, when used alone, a light transmission TL of 71%, namely a glass with the reference TSA 3+(hereinafter designated by the abbreviation TSA) by the company Saint-Gobain Glass, and the thermoplastic intermediate layer was a 0.76 mm thick PVB layer as in example 1. The coating of the outer glass sheet was obtained by producing a decoration on face F2 over the entirety of said face by inkjet printing using a single-pass machine equipped with six color print heads (with drying after deposition for 2 minutes at 130° C.) in order to obtain a layer of inks with a (final) thickness of 5 µm, the viscosity of the inks when deposited being less than 50 mPa·s, then by depositing on this decoration a non-stick layer by screen printing at a wet thickness of 15 µm (giving a final thickness of the layer of 6 µm) and at a viscosity of 15 Pa·s, before pre-firing for 180 s at 600° C., the outer glass remaining bare.

The inks used for the decoration and the material of the non-stick layer added were those in example 1.

The coated glass sheets were then curved as in example 1 and it was again observed that the two glasses could be easily separated and that no transfer of material was visible on the inner glass.

The coated sheets were then laminated as in example 1, the optical density of the coated glazing obtained being greater than 3. After laminating, the decoration was visible from outside the vehicle, the inner side of the glazing having a uniform appearance provided by the overlapping of the non-stick layer and of the ink layer, the reflection from the glass surface on face F4 also being conserved.

By way of comparison, for the same glazing performed in the same manner but this time without coating the decoration with the non-stick layer, the glasses were not able to be detached after bending without causing damage, parts of the decoration being transferred from the outer glass to the inner glass (contrary to the case of example 2 according to the invention making it possible to obtain curved glazing without damaging the aesthetic appearance of the decoration on face F2).

Example 3: In the third example according to the invention, a laminated glazing was produced for a motor vehicle roof formed of two glass sheets separated by a thermoplastic intermediate layer, this glazing being decorated on face F3 and having a functional thermal comfort layer on face F2. Each glass sheet was a 2.1 mm thick PLC glass sheet, and the thermoplastic intermediate layer was a PVB layer as in example 1. The coating of the inner glass sheet was obtained by producing a decoration on face F3 over the entirety of said face by inkjet printing using a single-pass machine equipped with six color print heads in order to obtain a layer of inks with a (final) thickness of 5 µm (with drying after deposition for 2 minutes at 130° C.), the viscosity of the inks when deposited being less than 50 mPa·s, then by depositing on this decoration a non-stick layer by screen printing at a wet thickness of 15 µm (giving a final thickness of the layer of 6 µm) and at a viscosity of 15 Pa·s, before pre-firing for 180 s at 600° C.

The outer glass sheet was further coated with a silver-based infrared reflective layer, this layer being deposited by magnetron sputtering on face F2.

The inks used for the decoration were those used in the previous examples, and the material of the non-stick layer added was an enamel with the reference 1L6030, sold by the company Johnson Matthey.

The coated glass sheets were then curved as in example 1 and it was again observed that the two glasses could be easily separated and that no transfer of material was visible on the inner glass.

The coated sheets were then laminated as in example 1, the optical density of the coated glazing obtained being greater than 3. After laminating, the decoration was visible from inside the vehicle, the outer side of the glazing having a uniform appearance provided by the overlapping of the non-stick layer and of the ink layer, the reflection from the glass surface on face F1 also being conserved, the infrared reflective layer on face F2 further providing thermal comfort to passengers.

By way of comparison, for the same glazing performed in the same manner but this time without coating the decoration with the non-stick layer, the glasses were not able to be detached after bending without causing damage, parts of the decoration being transferred from the inner glass to the outer glass (contrary to the case of example 3 according to the invention making it possible to obtain curved glazing without damaging the aesthetic appearance of the decoration on face F3).

Example 4: In the fourth example according to the invention, laminated glazing was produced for a motor vehicle roof formed of two glass sheets separated by a thermoplastic intermediate layer, this glazing being decorated on face F2 and having a functional thermal comfort layer on face F4. The outer glass sheet was a 2.1 mm thick PLC glass, the other glass sheet (inner) was a 2.1 mm thick soda-lime float glass referenced VG10 by the company Saint-Gobain Glass, and the thermoplastic intermediate layer was a 0.76 mm thick PVB layer as in example 1. The coating of the outer glass sheet was obtained by producing a decoration on face F2 over the entirety of said face by inkjet printing using a single-pass machine equipped with six color print heads in order to obtain a layer of inks with a (final) thickness of 5 µm (with drying after deposition for 2 minutes at 130° C.), the viscosity of the inks when deposited being less than 50 mPa·s, then by depositing on this decoration a non-stick layer by screen printing at a wet thickness of 15 µm (giving a final thickness of the layer of 6 µm) and at a viscosity of 15 Pa·s, before pre-firing for 180 s at 600° C.

The inner glass sheet was further coated with a low-emissivity layer, this layer being formed of ITO and being deposited by magnetron sputtering on face F4.

The inks used for the decoration were those used in the previous examples, and the material of the non-stick layer added was an enamel with the reference 1L6030, sold by the company Johnson Matthey.

The coated glass sheets were then curved as in example 1 and it was again observed that the two glasses could be easily separated and that no transfer of material was visible on the inner glass.

The coated sheets were then laminated as in example 1, the optical density of the coated glazing obtained being greater than 3. After laminating, the decoration was visible from outside the vehicle, the inner side of the glazing having a uniform appearance provided by the overlapping of the non-stick layer and of the ink layer, the reflection from the glass surface on face F4 also being conserved, the low-emissivity layer on face F4 further providing thermal comfort to passengers.

Example 5: In the fifth example according to the invention, a monolithic glazing was produced for a motor vehicle roof formed of a single glass sheet decorated on face F2. The glass sheet was 2.1 mm thick PLC glass. The coating of the glass sheet was obtained by producing the decoration on face F2 over the entirety of said face by inkjet printing using a single-pass machine equipped with six color print heads in order to obtain a layer of inks with a (final) thickness of 5 μm (with drying after deposition for 2 minutes at 130° C.), the viscosity of the inks when deposited being less than 50 mPa·s, then by depositing on this decoration a non-stick layer by inkjet at a wet thickness of 15 μm (giving a final thickness of the layer of 6 μm) and at a viscosity of 15 Pa·s, before pre-firing for 180 s at 600° C.

The inks used for the decoration were the same inks as in example 1, and the material of the non-stick layer added was an ink referenced DJ70474, sold by the company Prince Minerals.

The coated glass sheet was then curved by pressing for a few hundred seconds at temperatures of around 680° C. without any transfer of material occurring to the pressing die. The optical density of the coated glazing obtained was greater than 3. The decoration, having not suffered any damage during bending, was visible from outside, the inner side of the glazing having a uniform "carbon effect" black appearance provided by the overlapping of the non-stick layer and of the ink layer, the reflection from the glass surface on face F1 also being conserved.

By way of comparison, for the same glazing produced in the same manner but this time without coating the decoration with the non-stick layer, the bending soiled the pressing die and the decoration obtained was incomplete (in contrast to the case of example 5 according to the invention making it possible to obtain a curved glazing without damaging the aesthetic appearance of the decoration on face F3 and without damaging the bending tool).

In the examples according to the invention given previously, the inks used particularly showed:
  satisfactory lamination feasibility on Solutia RB41,
  a scratch resistance of approximately 20 N, compatible with the specifications of the motor vehicle,
  good results in the weathering resistance test of standard EN1 096-2 on coated glass (differing from the standard automotive specifications but designed to test the same characteristics).

Furthermore, resistance to soiling and the ability to be cleaned were assessed using protocols detailed in standard EN14428 simulating the cleaning of a glass plate, and gave satisfactory results.

The glazing according to the invention may particularly be used advantageously to produce a novel range of motor vehicle roofs for transport vehicles.

The invention claimed is:

1. A method for manufacturing a motor vehicle roof incorporating a glazing, the method comprising applying by digital printing at least one opacifying layer of ink(s), over at least 40% of a surface of a face of at least one glass sheet, such that a composition of said ink(s) comprises at least one glass frit, and optionally one or more inorganic pigment(s), with a D90 value for a particle size distribution of less than 2 μm, and such that said ink(s) have a viscosity of between 1 and 50 mPa·s, said ink(s) further comprising a non-stick agent and/or a non-stick component and/or at least one non-stick agent and/or at least one non-stick layer being further applied to at least one layer of ink(s) and/or to at least one glass sheet.

2. The method according to claim 1, wherein the digital printing is performed using a single-pass printing machine.

3. The method according to claim 1, wherein a printer used to digitally print the at least one opacifying layer of ink(s) is equipped with six series of print heads to enable printing with a set of six colors.

4. The method according to claim 1, wherein a surface tension of the ink(s) is between 20 and 40 mN/m.

5. The method according to claim 1, wherein the at least one opacifying layer of ink(s) is applied by inkjet.

6. The method according to claim 1, wherein the at least one opacifying layer of ink(s) is at least one layer of colored ink(s).

7. A motor vehicle roof able to be obtained by the method according to claim 1, said vehicle roof incorporating a glazing comprising:
  one or more glass sheets, at least one glass sheet being coated over at least 40% of the surface of at least one face with at least one opacifying layer of ink(s), such that the composition of said ink(s) comprises at least one glass frit, and
  at least one layer of ink(s) and/or at least one glass sheet being coated with at least one non-stick agent and/or at least one non-stick layer, and/or
  at least one layer of ink(s) comprising at least one non-stick agent and/or one non-stick component.

8. The motor vehicle roof according to claim 7, wherein the opacifying layer of ink(s) is at least one layer of colored ink(s).

9. The motor vehicle roof according to claim 7, wherein the composition of said ink(s) comprises one or more inorganic pigment(s).

10. The motor vehicle roof according to claim 7, wherein said glazing is a monolithic glazing formed of a single glass sheet, said sheet being coated with at least one layer of said ink(s) on one face, or wherein said glazing is a laminated glazing formed of at least two glass sheets and an interlayer, at least one of said two glass sheets being coated with at least one layer of said ink(s) on one face.

11. The motor vehicle roof according to claim 7, wherein said glazing has a light transmission TL of less than 10%, or an optical density of greater than or equal to 1.

12. The motor vehicle roof according to claim 7, wherein two different decorations are printed, for a different effect on an outside and on an inside of a passenger compartment.

13. The motor vehicle roof according to claim 7, wherein several layers of inks are overlayed on the same face in order to produce a double image.

14. The motor vehicle roof according to claim 7, wherein said glazing is equipped, on the same face and/or on at least two different faces of glass sheet(s) of the glazing, with at least two different coatings or two different layers including at least one layer of said ink(s), a second layer of the two different layers or a second coating of the two different coatings being either a second mineral layer formed of digital printing ink(s), or a layer with a different decorative effect from said layer or layers of ink(s), or a layer or a coating or a film or a sheet with an additional functional effect.

15. The motor vehicle roof according to claim 10, wherein said single glass sheet is coated with said at least one layer of said ink(s) on a face facing an interior of the vehicle.

16. The motor vehicle roof according to claim 10, wherein said two glass sheets include an exterior glass sheet to be oriented toward an exterior of the vehicle and an interior glass glass to be oriented toward an interior of the vehicle, and wherein said at least one layer of said ink(s) is coated on a face of the exterior glass sheet facing the interlayer, or is coated on a face of the interior glass sheet facing the interlayer or is coated on a face of the interior glass sheet facing the interior of the vehicle.

17. The motor vehicle roof according to claim 11, wherein said glazing has a light transmission TL of less than 0.1%, or an optical density of greater than or equal to 3.

18. The motor vehicle roof according to claim 13, wherein the several layers of inks include a first layer or print forming a first image, a second layer or print being a white layer, and a third layer or print forming a second image.

19. The motor vehicle roof according to claim 14, wherein the layer or the coating or the film or the sheet with an additional functional effect is a low-emissivity or solar control coating.

* * * * *